United States Patent [19]

Sasaki

[11] Patent Number: 5,115,008
[45] Date of Patent: May 19, 1992

[54] CURABLE FILM FORMING COMPOSITIONS

[75] Inventor: Yukihiko Sasaki, Claremont, Calif.

[73] Assignee: Avery Dennison Corporation, Pasadena, Calif.

[21] Appl. No.: 566,560

[22] Filed: Aug. 9, 1990

Related U.S. Application Data

[63] Continuation of Ser. No. 57,504, Jun. 3, 1987.

[51] Int. Cl.⁵ .................. C08K 5/01; C08L 53/00; C08J 7/04
[52] U.S. Cl. .................... 524/271; 428/355; 522/110; 524/272; 524/274; 524/276; 524/476; 524/483; 524/484; 524/486; 524/505; 525/98; 525/193; 525/194
[58] Field of Search ............... 524/274, 271, 276, 476, 524/484, 505, 486, 272, 483; 428/355; 522/110; 525/98, 193, 194

[56] References Cited

U.S. PATENT DOCUMENTS

| | | | |
|---|---|---|---|
| 4,151,057 | 4/1979 | St. Clair et al. | 428/461 |
| 4,152,231 | 5/1979 | St. Clair et al. | 428/508 |
| 4,243,500 | 1/1981 | Glennon | 525/98 |
| 4,286,077 | 8/1981 | St. Clair et al. | 524/505 |
| 4,634,729 | 1/1987 | Paulin et al. | 524/285 |
| 4,699,842 | 10/1987 | Jorgensen et al. | 428/355 |
| 4,822,653 | 4/1989 | Kaufman | 428/355 |
| 4,833,193 | 5/1989 | Sieverding | 428/355 |
| 4,835,217 | 5/1989 | Jorgensen | 525/93 |
| 4,857,594 | 8/1989 | Lakshmanan | 524/505 |
| 4,861,635 | 8/1989 | Carpenter et al. | 428/355 |

Primary Examiner—Herbert J. Lilling
Attorney, Agent, or Firm—Christie, Parker & Half

[57] ABSTRACT

There are provided a pressure-sensitive adhesive and other compositions which free radical cured mixtures of at least one unsaturated elastomeric polymer and at least one organic additive which is substantially nonresponsive to action of free radicals and present in an amount sufficient to modify the properties of the cured elastomeric polymer.

17 Claims, 5 Drawing Sheets

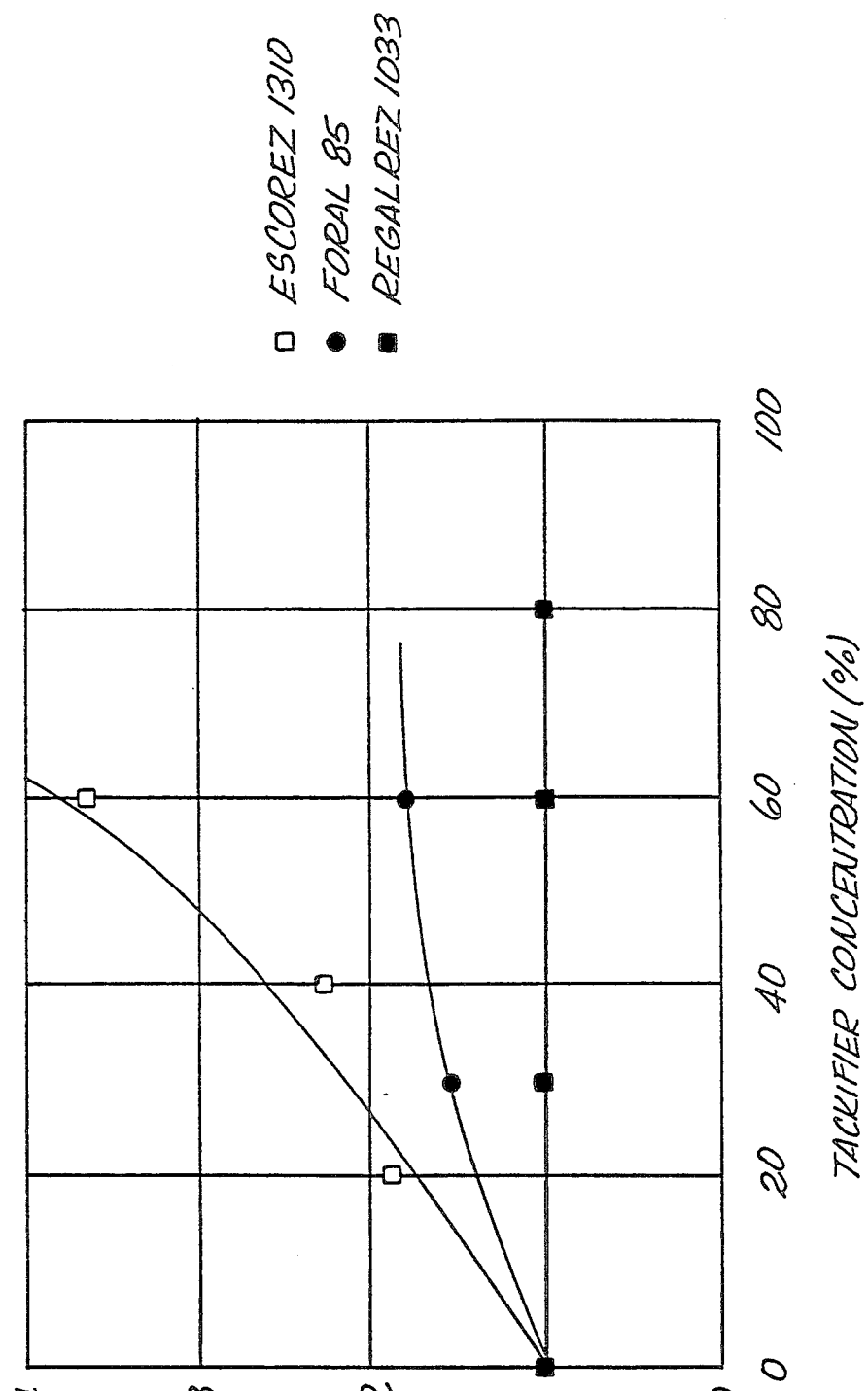

CURABLE FILM FORMING COMPOSITIONS this is a continuation of application Ser. No. 07/057,504 filed Jun. 3, 1987.

BACKGROUND OF THE INVENTION

This invention is directed to reducing the energy requirements to improve the properties of multicomponent polymer systems which form pressure-sensitive adhesives.

Properties of unsaturated pressure sensitive adhesive compositions can be improved by use of actinic radiation, such as ultraviolet (UV) radiation; electron beam (EB) radiation; and chemical or thermal cure. Normally, the adhesive is applied to facestock and/or a release liner and subjected to a suitable curing action to improve such properties as elevated temperature shear.

One means of cure is electron beam (EB) radiation. While the facestock and/or release liner can sustain electron beam dosages up to a certain level, e.g., 80 to 100 kiloGray (kGy). going beyond that level can result in degradation of components of adhesive label and tape constructions such as the face stock and/or release liner and/or adverse reactions between the adhesive and the silicon release agent of the release liner.

Increased radiation requirements, whether EB or actinic, will reduce the speed at which an adhesive coated substrate can pass under the radiating surface or increase the number of radiating surfaces. Both are costly.

The present invention is directed to reducing the energy required to achieve a positive modification in a pressure sensitive adhesive formed of at least two components, one an unsaturated elastomeric polymer component, the other an organic additive component which is one or more organic additives which are at least dispersable in the elastomeric component. Typically, the organic additive component is provided to tackify or plasticize the elastomeric component.

SUMMARY OF THE INVENTION

According to the present invention, there are provided pressure-sensitive adhesive compositions which comprise in combination at least one unsaturated elastomeric polymer capable of undergoing gel forming reactions in the presence of free radicals preferably generated by actinic radiation or electron beam radiation, and at least one organic additive which is substantially nonresponsive to free radicals and which is at least dispersable and preferably soluble in the elastomeric polymer. The elastomeric polymer preferably has a glass transition temperature of from about $-20°$ to about $-100°$ C. The organic additive affects a property of the pressure-sensitive adhesive composition, such as tack or other properties. The improvement resides in the use of a organic additive which is substantially nonresponsive to the action of free radicals, as defined herein, while providing, upon cure, a pressure-sensitive adhesive composition having a glass transition temperature of at least $10°$ C., preferably at least $20°$ C. below use temperature.

After cure, with the increase of gel content, the combination exhibits a positive change in properties such as elevated temperature shear. This occurs at substantially lower levels of free radical generation that would have been required were the organic additive to consume a significant amount of free radicals.

BRIEF DESCRIPTION OF THE DRAWINGS

FIG. 5 compares the relative incipient gel dosage as function of tackifier concentration for Excorez TM 1310, Foral TM 85 and Regalrez TM 1033.

DETAILED DESCRIPTION

Figure 1:
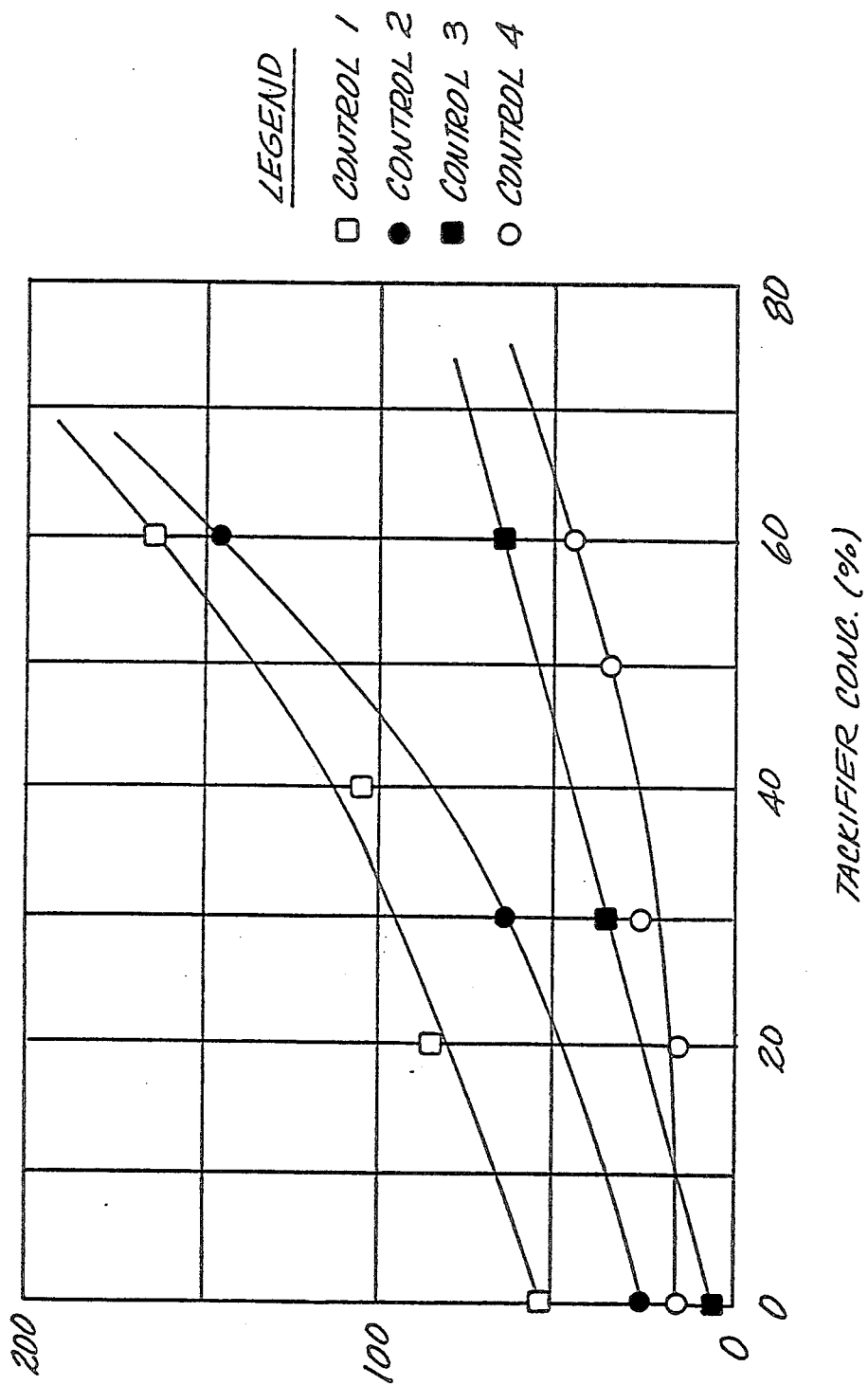
FIG. 1 illustrates the EB dosage requirements to achieve incipient gel formation using unsaturated tackifiers in unsaturated elastomers as a function of tackifier concentration.

The present invention is directed to reducing the energy requirements of free radical cross-linking of unsaturated elastomeric polymers which are part of multi-component compositions such as pressure-sensitive adhesives in which unsaturated elastomeric polymers are tackified or otherwise modified as to physical properties by addition of at least one organic additive.

Properties of the pressure-sensitive adhesive composition are, in accordance with the present invention, enhanced by free radical cure, with free radicals preferably generated by electron beam (EB) radiation, or actinic radiation, such as ultraviolet (UV) curing, with or without photoinitiators and/or photosensitizers. The invention also contemplates thermal curing with or without thermal initiators. The improvement resides in utilizing as a property modifying additive, an organic additive which is substantially nonresponsive to the action of free radicals.

By the term "organic additive which is substantially nonresponsive to the action of free radicals" (also organic additive herein) there is meant saturated organic compounds and organic compounds which, when blended with an unsaturated elastomeric polymer in proportions of about 40 parts by weight of the unsaturated elastomeric polymer and 60 parts by weight organic compound, will form a blend having a relative incipient gel dosage, i.e. the ratio of incipient gel dosage of the blend to the incipient gel dosage of the unsaturated elastomeric polymer, of no more than about 1.85, preferably 1.65. The measurement is made for a blend which is free of external cross-linking agents and for an EB radiation at 200 KV.

For electron beam radiation, incipient gel dosage is determined as a minimum amount of electron beam (EB) dosage in kiloGray required to form a toluene insoluble gel. Insoluble gel is measured by placing 200 milligrams of a directly irradiated sample into 10 grams of toluene checking for the presence of insoluble material after 24 hours standing. Radiation is increased (or decreased) in increments of 10 kGy. If the solution appears clear upon visual inspection it is filtered through qualitative filter paper to check for the presence of gel. The procedure is repeated for each 10 kGy dosage level increment and the dosage at which gelation occurs is interpolated from the data. If a gel was not observed, for example, at 60 kGy, but was at 70 kGy, the value of incipient gel dosage is reported as 65 kGy. In each instance, the sample is coated from a toluene solution onto a release paper (50–75g/m²) and dried in an oven. The sample surface was directly exposed to EB radiation at 200 KV with inerting to 400 ppm $O_2$ or less. For values reported herein, the EB unit used was manufactured by Energy Sciences.

By the preferred use of organic additives which are substantially nonresponsive to the action of free radicals, the energy required to achieve a level of cross-linking within the unsaturated elastomeric copolymer can remain unchanged and independent of organic additive concentration.

For unsaturated compounds, saturation to a level sufficient to meet the definition can be achieved by hydrogenation or otherwise eliminating aromatic or aliphatic unsaturation with addition of groups which do not consume free radicals. In the alternative, saturated or partially hydrogenated organic compounds may be blended with saturated and/or highly saturated organic additives to achieve the desired result, namely a reduction of incipient dosage requirements to acceptable levels.

While not limiting, the invention will, for simplicity, be described in terms of improving the properties of pressure-sensitive adhesives based on unsaturated natural and synthetic elastomeric polymers including, but not limited to, block, random or multiarmed copolymers and mixtures thereof. Among the useful unsaturated elastomeric polymers there may, however, be mentioned natural rubber, polybutadiene, polyisoprene, polybutyl rubber, ethylene propylene diene rubbers, styrene-butadiene block copolymers, styrene-butadiene-styrene block copolymers, styrene-isoprene block copolymers, styrene-isoprene-styrene block copolymers, multiarmed styrene-isoprene block copolymers and the like. Useful unsaturated elastomeric polymers are also disclosed in U.S. Pat. No. 4,556,464 to St. Clair incorporated herein by reference.

Preferably, the elastomeric block polymers to which the invention is directed are ABA block or multiarmed $(AB)_x$ block copolymers, wherein x has a value of 2 or more and mixtures thereof and wherein A is a block comprising at least one monoalkenyl arene, preferably styrene, alpha methyl styrene, vinyl toluene and the like, and B is an elastomeric conjugated diene block such as a polybutadiene or a polyisoprene block with polyisoprene blocks preferred.

More preferably, the elastomeric copolymers are formed of styrene-butadiene-styrene block copolymers and/or styrene-isoprene-styrene block, multiarmed styreneisoprene block copolymers, polybutadiene and polyisoprene. Mixtures of elastomers may be employed.

Unsaturated elastomeric polymers forming the base resin of the invention are or may be adapted to hot melt, solvent or emulsion coating. They are preferably free radical cross-linked using actinic radiation, with or without a photoinitiator, or by electron beam (EB) radiation. Cure is to overcome the major deficiency of pressure-sensitive adhesives based on unsaturated elastomeric polymers, namely, to have acceptable elevated temperature cohesive strength. Crosslinking of the base polymer has been used to enhance cohesive properties of the adhesives especially to improve elevated temperature shear performance. Thermal crosslinking has been the most commonly used method limited to solution or emulsion polymers.

Thermal crosslinking during hot melt processing of unsaturated elastomeric polymers has been the most difficult to achieve due to undesirable and premature crosslinking during compounding, storage and coating operations. As a consequence in-line mixing of crosslinking agents with a melt has been required to avoid premature cure.

Actinic and Electron Beam radiation can overcome this difficulty; however, if external crosslinkers are included, thermal instability may become a problem.

All systems can benefit by the use of external crosslinkers. Crosslinkers which are multifunctional monomers such as acrylates and methacrylates are thermally reactive and the process to achieve cure also requires in-line mixing to avoid premature crosslinking independent of the ultimate means of cure. The same is true of other crosslinking agents which are functional at much lower concentrations. Polythiol crosslinkers, for instance, are functional at concentrations of about 10% or less by weight of the total composition. The polythiol cross-linkers include for instance, pentaerythritoltetrathioglycolate, pentaerythritol-tetra(3-mercaptopropionate), trimethylolethanetrimercaptopropionate, trimethylolpropanetrithioglycolate, trimethylolpropane tri(3-mercaptopropionate) and the like.

As with the multifunctional acrylates and methacrylates, the polythiol cross-linkers are preferably added to the composition by in line mixing. The purpose is to avoid premature crosslinking before cure the pressure sensitive adhesive composition.

The unsaturated elastomeric base copolymers are not normally pressure sensitive adhesives and pressure-sensitive adhesive properties are induced by the addition of other hydrocarbon materials known as tackifiers. One use of the organic additives of this invention is as a tackifier.

To avoid excess consumption of free radicals and the introduction of excess energy into the system, any significant amount of hydrocarbon added to modify the properties of the elastomeric resin is in the form of organic additives which are substantially nonresponsive to free radicals. Their inclusion does not substantially affect the ability to achieve improved elevated temperatures properties such as shear by the action of the free radicals and add their beneficial properties, e.g., tack to the cured product.

As examples of organic additives which are substantially nonresponsive to free radicals there may be mentioned hydrogenated organic compounds, such as hydrogenated aromatic resins including hydrogenated polystyrene, polyalpha-methyl styrene, polyvinyl toluene, copolymers of styrene with other monomers and the like; hydrogenated aliphatic resins derived from petroleum based products; highly hydrogenated rosins and rosin esters: hydrogenated white oil, mineral oil and the like. As specific tackifiers employed in the practice of the invention there may be mentioned hydrogenated styrene based resins such as Regalrez ™ resins designated as 1018, 1033, 1065, 1078, 1094 and 1126 manufactured and sold by Hercules, Inc.; Regalrez ™ 6108 a 60% hydrogenated aromatic resin, also manufactured by Hercules; hydrogenated C5 and/or C9 hydrocarbon feed stocks such as Arkon ™ P-70, P-90, P-100, P-125, P115, M-90, M-100, M-110 and M-120 resins manufactured and sold by Arakawa Chemical and Regalite ™ R-100, MGB-63, MGB-67, MGB-70, resins manufactured and sold by Hercules, Inc.; hydrogenated Polycyclo-pentadienes such as Escorez ™ 5320, 5300 and 5380 resins manufactured and sold by Exxon Chemical, hydrogenated polyterpene and other naturally occurring resins such as Clearon ™ P-105, P-115, P-125, M-105, M-115 manufactured and sold by Yasuhara Yushi Kogyo Co. Ltd. of Japan and Eastotack ™ H-100, H-115 and H-130 resins manufactured and sold by Eastman chemical and the like; Kaydol ™ hydrogenated mineral oil manufactured and sold by Witco Chemical and the like.

To be generally useful, organic aromatic additives should effectively be at least 50% preferably at least 60% saturated and for the aliphatic hydrocarbon at least 65% preferably 80% of unsaturated groups in the product as formed should be saturated or otherwise rendered nonresponsive to the action of free radicals. Complete saturation is preferred or at least saturation to a level where upon inclusion into the elastomer there will be a negligible additional consumption of free radicals over that required to achieve the same level of cure by crosslinking of the unsaturated elastomeric polymer. Some aromatic unsaturation is necessary for compatibility with butadiene containing elastomers.

Organic additives which serve a tackifying function normally present in a concentration ranging from about 40% to about 90% by weight, of mixture of total, preferably from about 45% to about 85% by weight of the mixture of unsaturated elastomeric polymers and tackifying organic additives. Compositions containing less than about 40% by weight of an organic additive typically do not have sufficient "quickstick" or initial grab and compositions having too high a tackifying organic additive have too low a cohesive strength even when cross-linked.

The compositions of the instant invention may be and normally are made up of components (unsaturated elastomeric polymer and organic additives) having multiple glass transition temperatures. To be functional as a pressure sensitive adhesive the composition must have at least one glass transition temperature at least about 10° C. below use temperatures, preferably at least 20° C. below use temperatures.

As compared to ABA block copolymers, the presently preferred unsaturated elastomeric polymers are multi-armed styrene isoprene block copolymers having the formulas $(SI)_x$ where x generally has a value greater than 2.

Linear styrene-isoprene (SI) and styrene-isoprene-styrene (SIS) block copolymers do not perform as well as multi-armed (SI) polymers in forming radiation-cured pressure sensitive adhesives at lower curing doses. This problem may be solved by the use of organic additives of this invention which, unlike most conventional tackifiers, do not consume an excessive amount of radical during crosslinking thereby conserving cost and product quality.

I have found that high molecular weight styrene-isoprene multi-armed block copolymers, alone or together with other elastomers, such as SB, SBS and SIS when formulated with organic additives which are saturated, hydrogenated tackifying resins give pressure sensitive adhesive formulae which show superior ease of cure and when cured superior elevated temperature shear properties. Properties after cure, match or surpass the elevated temperature shear performance of any hot melt adhesives commercially available.

Presently preferred formulation ranges for high performance pressure-sensitive adhesives containing multi-armed (or radial) styrene-isoprene block copolymers are on a by weight basis as follows:

15-60 parts unsaturated elastomeric polymer(s)
85-40 parts tackifying organic additives
0-10 parts crosslinking agents Antioxidants are added as required. In low concentrations, the multiarmed block copolymers may be considered as an elastomeric crosslinking additive.

The following Examples and Controls are designed to illustrate the instant invention.

Base unsaturated elastomeric polymers used were a mixture of linear styrene-isoprene-styrene (SIS) and styrene-isoprene (SI) block copolymers known as Kraton ™ D-1107 and D-1111; styrene-butadiene-styrene (SBS) block copolymers known as Kraton ™ D-1101 and D-1102 and DX-1300 and multi-armed $(SI)_x$ block copolymer known as Kraton ™ D-1320X[1] all manufactured and sold by Shell Chemical Company and styrene-butadiene block copolymer known as Solprene ™ 1205 manufactured and sold by Housemex, Inc. As representative cf an unsatisfactory tackifying unsaturated alphatic resin there was used Escorez ™ 1310, a petroleum based hydrocarbon resin manufactured and sold by Exxon Chemical Company, and Piccolite ™ A-115, an alpha-pinene resin manufactured and sold by Hercules, Inc. Foral-85, a well known hydrogenated rosin ester manufactured and sold by Hercules, Inc. may be functional or nonfunctional as an organic additive depending on the elastomer(s) it is combined with. The organic additives which are used to illustrate the instant invention are of the Escorez ™ 5000 series. Also used to illustrate the practice of the invention are Regalrez ™ 6108, 1078 and 1000 series of resins. Kaydol ™ mineral oil was as a representation of hydrogenated oil. The invention is primarily illustrated in respect of effect of unsaturation of the organic compound, namely, a tackifier, on incipient or relative incipient gel dosage (the incipient gel dosage cf a mixture divided by the incipient gel dosage of the elastomer) required to initiate gel formation versus resin concentration in percent by weight. Incipient gel dosage is measured as defined above. To establish product properties, the formulation was coated from toluene onto a release paper ($50g/m^2$), dried in an oven and laminated to a 50 micron thick polyester film. EB radiation was through the polyester film. 180° Peel in Newtons per Meter (N/M) were determined using PSTC-1 at 20 minute dwell. Loop tack was measured by forming a loop from a 1 inch by 8 inch strip, adhesive face out, inserted in the jaws of an Instron tester and moving the loop at the rate of 12 inches per minute onto a stainless steel panel, then removing the strip at the rate of 12 inches per minute as soon as one square inch of contact is made. The highest force required to remove the loop is reported in N/M. Shear reported in Kiloseconds (K. S.) was for 0.5×0.5 inch overlap on a stainless steel panel at a 500 gram force load. Also known as TRW-6-1523 and DX-XL.

While the invention has been described in terms of pressure sensitive adhesives, it embraces other cured compositions comprising a free radical cured mixture of at least one unsaturated elastomeric polymer and at least one organic additive which is substantially nonresponsive to the action of free radicals and present in an amount sufficient to modify a physical property of the elastomeric polymer.

CONTROLS 1-4

The study was performed to establish the effect of using conventional tackifying resins to tackify elastomers on the electron beam (EB) dosage required to achieve incipient gel formation as a function of tackifier (resin) content. There was employed SIS elastomeric polymers known as Kraton TM D-1107 (Control 1), SBS block copolymers Kraton TM D-1101 (Control 2) and DX 1300 (Control 3) and Kraton TM D-1320X, a multi-armed styrene-isoprene block copolymers (Control 4).

The study established, first of all, the base level of EB dosage necessary to achieve a cohesive strength improvement as evidenced by gel formation in the base elastomer, more particularly, where at least 10% of the elastomer of adhesive composition formed an insoluble gel. FIG. 1 shows that incipient gel dosage increases dramatically as the elastomer is diluted with conventional tackifiers. Since conventional elastomer based pressure-sensitive adhesives contain about 40–90% by weight added tackifying resins, this means that the typical adhesive formulations required an EB dosage of 2-5 times higher than the dosage required for the elastomer itself to achieve an incipient gel formation when an unsaturated C-5 hydrocarbon Escorez TM 1310, (Controls 1 and 4) and Piccolite A-115 alpha-pinene (Controls 2 and 3) tackifiers are used as the tackifying resins. The elastomer requiring the lowest dosage was the multiarmed $(SI)_x$ copolymer.

EXAMPLES 1 and 2

Figure 2:
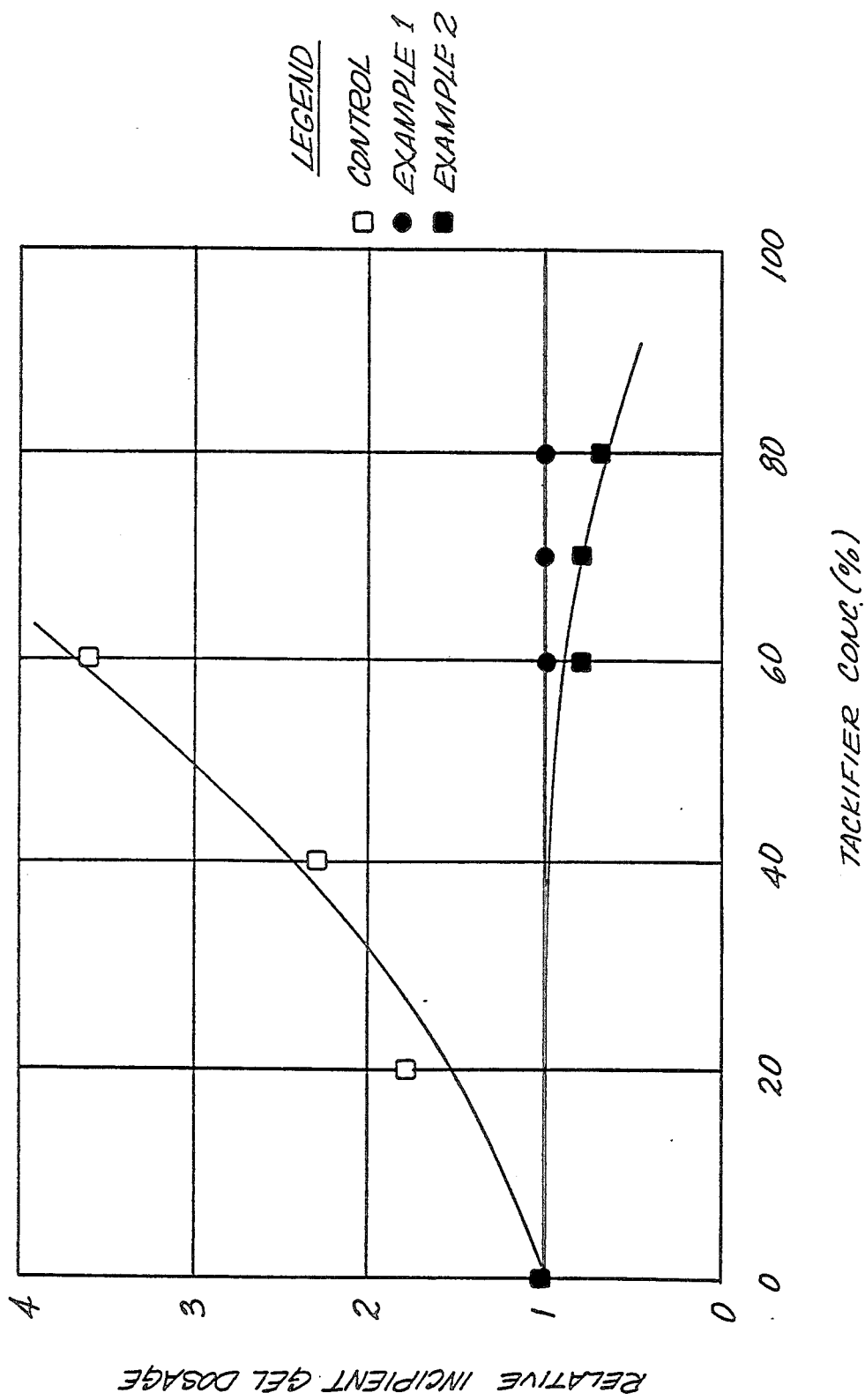
FIGS. 2 and 3 establish as compared to a free radical consuming tackifier, that use of dosage for tackifying organic additives employed in accordance with this invention will not change the incipient gel dosage of unsaturated elastomeric copolymer to which they are added in varying concentrations.

FIG. 2 shows the relative EB dosage level required to achieve incipient gel formation for the compositions based on Kraton TM D-1107. To illustrate the invention there Was used Regalrez TM 1033 an 100% hydrogenated (saturated) aromatic resin manufactured by Hercules, Inc. (Example and Escorez TM E-5380, a saturated aliphatic hydrocarbon manufactured by Exxon (Example 2). The comparison was Control 1. As can be seen incipient dosage to gel increased in proportion to the amount of unsaturated tackifying resin introduced to the rubber whereas the use of the hydrogenated tackifiers causes the incipient dosage to remain the same or in some instances reduced.

EXAMPLE 3 and CONTROL 5

Figure 3:
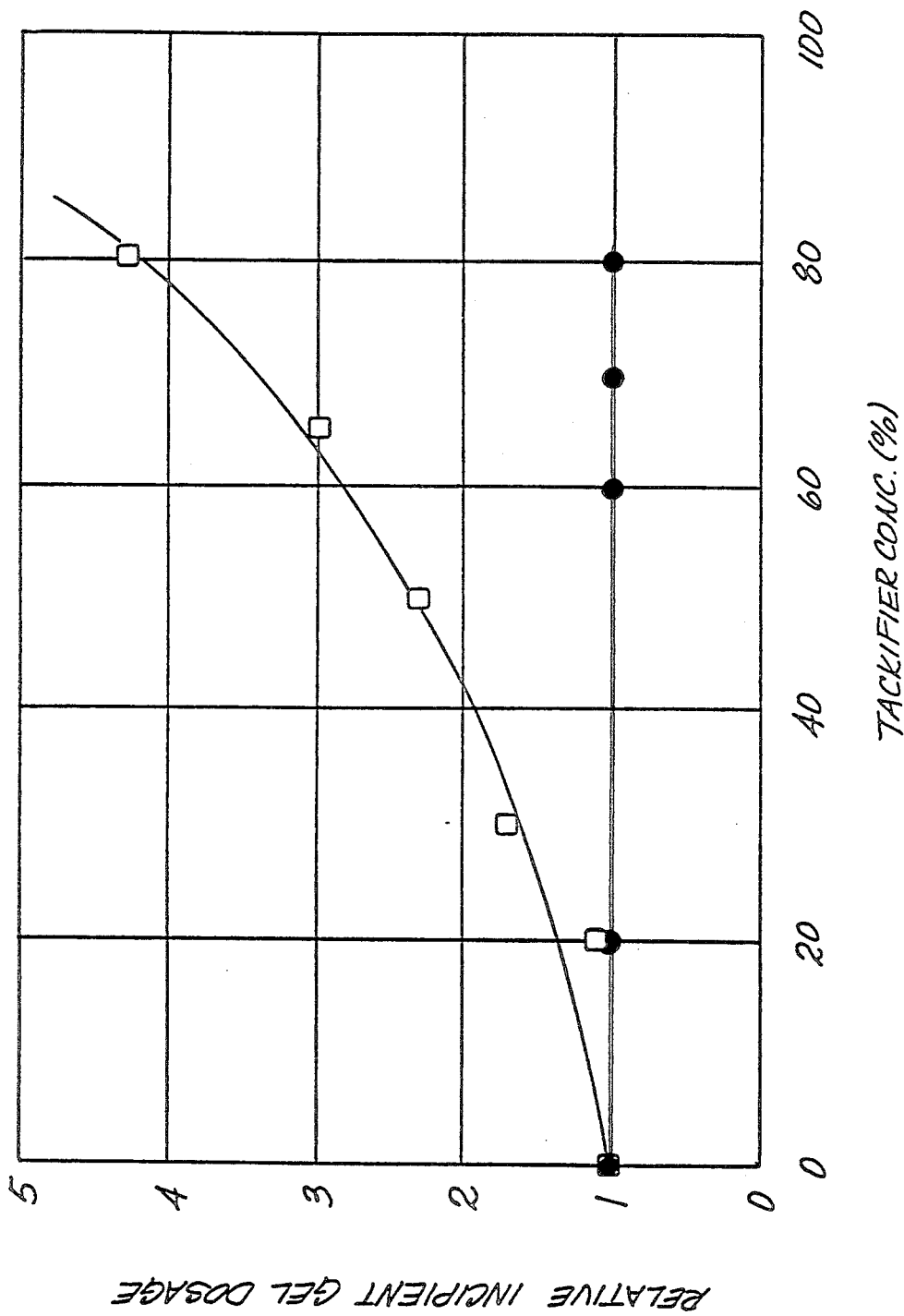

Using the same procedure as the previous Examples and Controls, FIG. 3 shows the effects of a saturated tackifier, Escorez TM 5380, (Example 3) and an unsaturated tackifier, Escorez TM 1310 (Control 5) have on the relative incipient gel dosage required to achieve gel formation for a multi-armed styrene-isoprene block copolymer (Kraton TM -D-1320X).

CONTROL 6 AND 7 EXAMPLES 4 to 7

Table 1 tabulates the improved high temperature properties induced to Kraton TM D-1107 and Kraton TM D-1320X using as the saturated tackifier Regalrez TM 1078. While 180° peel remain essentially unchanged there is dramatic improvement in elevated temperature shear.

TABLE 1

| Component Parts | Cont 6 | Ex 4 | Ex 5 | Cont 7 | Ex 6 | Ex 7 |
| --- | --- | --- | --- | --- | --- | --- |
| Kraton TM D-1107 | 35 | 35 | 35 | — | — | — |
| Kraton TM D-1320X | — | — | — | 35 | 35 | 35 |
| Regalrez TM 1078 | 65 | 65 | 65 | 65 | 65 | 65 |
| Antioxidant | 1 | 1 | 1 | 1 | 1 | 1 |
| EB Dosage, kGy | 0 | 75 | 100 | 0 | 75 | 100 |
| 180° Peel at 23° C., (N/M) | 1490 | 1770 | 1460 | 1690 | 1220 | 1320 |
| 180° Peel at 70° C., (N/M) | 350 | 440 | 310 | 320 | 390 | 320 |
| Looptack, (N/M) | 1490 | 2300 | 2350 | 1690 | 1220 | 1320 |
| Shear at 70° C., (K.S.) | 1.1 | 4.4 | 7.2 | 0.15 | 7 | 17.8 |

CONTROL 8 and EXAMPLES 8 and 9

Figure 4:
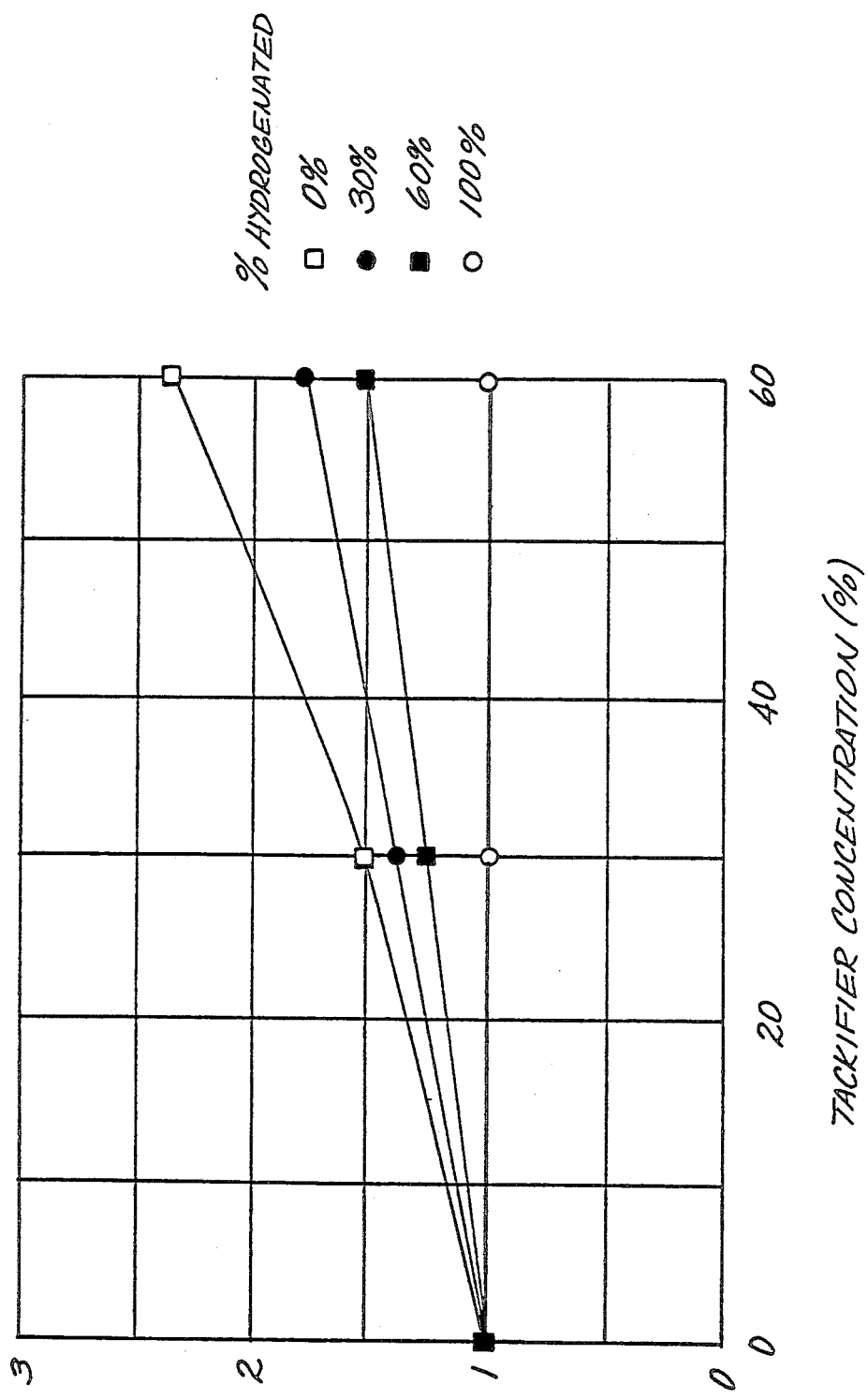
FIG. 4 illustrates the effect of unsaturation on relative incipient gel dosage as a function of tackifier concentration for aromatic tackifiers at different levels of hydrogenation.

FIG. 4 shows the relative incipient gel formation dosage for Kraton TM D-1107 using an aromatic tackifier of different levels of unsaturation. They are manufactured and sold by Hercules, Inc., under the designation Piccolastic TM A-50 (0% hydrogenated), Regalrez TM 3102 (30% hydrogenated); Regalrez TM 6108 (60% hydrogenated) and Regalrez TM 1033 (100% hydrogenated). As shown in FIG. 4, the higher the degree of hydrogenation the lower the dosage required, for a given level of resin concentration, to form a gel. This is important since a certain amount, usually 30-40% of the base rubber, must be crosslinked to form a network in order to achieve a significant improvement in physical properties.

CONTROLS 1 AND 9 AND EXAMPLES 6

As recognized, partially hydrogenated rosins have been used as premium tackifier resins for a long time. One of the best is Foral 85 manufactured by Hercules, Inc. According to information available from Hercules, Inc., it is about 60% hydrogenated. FIG. 5 establishes that for Kraton TM D-1107, Foral 85 (Control 8) is on a comparative basis significantly better than Escorez TM 1310 (Control 1) as a relatively low free radical consumer but not as good as Example 6 where Regalrez TM 1033 a saturated hydrocarbon was used as the tackifier.

CONTROLS 10 TO 15 AND EXAMPLES 10 TO 15

- Endex TM 160 is an aromatic end-block reinforcing resin compatible with the polystyrene phase of the block copolymer Kraton D-1107 but not compatible with the elastomeric polyisoprene phase. It does not substantially interfere with crosslinking in presence of an organic additive (Table 2) or a blend thereof (Table 3) but synergistically provided exceptionally high elevated temperature shear strength on EB cure.

CONTROLS 16, 17 AND 18, EXAMPLES 16, 17 AND 18

The following is to show that a mixture of saturated tackifiers Escorez TM 5300 and Regalrez TM 1065 can be used to improve high temperature shear performance of a multiarmed styrene-isoprene rubber Kraton TM D-1320X.

The formulations in parts by weight is shown in Table 4 and the adhesive properties as a function of EB dosage in Table 5 wherein "ETS" means elevated temperature shear in kiloseconds.

TABLE 4

| Formula | Elastomer | Escorez ™ 5300 | Regalrez ™ 1065 |
|---|---|---|---|
| 1 | 30 | 11.7 | 58.3 |
| 2 | 30 | 30.9 | 39.1 |
| 3 | 40 | 44.2 | 15.8 |

TABLE 2

|  | Cont 10 | Ex 10 | Cont 11 | Ex 11 | Cont 12 | Ex 12 |
|---|---|---|---|---|---|---|
| Kraton D-1107, parts | 40 | 40 | 40 | 40 | 40 | 40 |
| Regalrez 1078, parts | 60 | 60 | 60 | 60 | 60 | 60 |
| Endex 160, parts | — | — | 10 | 10 | 15 | 15 |
| Antioxidant, parts | 1 | 1 | 1 | 1 | 1 | 1 |
| EB dosage (kGy) | 0 | 75 | 0 | 75 | 0 | 75 |
| 180° Peel, (N/M) | 1110 | 1160 | 1350 | 1220 | 1190 | 1000 |
| Looptack, (N/M) | 1890 | 1880 | 2250 | 1860 | 1890 | 1540 |
| 70° C. Shear (K.S.) | 0.1 | 3.2 | 3.2 | 50.1 | 6.7 | 81.7 |

TABLE 3

|  | Cont 13 | Ex 13 | Cont 14 | Ex 14 | Cont 15 | Ex 15 |
|---|---|---|---|---|---|---|
| Kraton D-1107, parts | 40 | 40 | 40 | 40 | 40 | 40 |
| Regalrez 1078, parts | 40 | 40 | 40 | 40 | 40 | 40 |
| Escorez 5320, parts | 20 | 20 | 20 | 20 | 20 | 20 |
| Endex 160, parts | 0 | 0 | 10 | 10 | 15 | 15 |
| Antioxidant, parts | 1 | 1 | 1 | 1 | 1 | 1 |
| EB dosage (kGy) | 0 | 75 | 0 | 75 | 0 | 75 |
| 180° Peel, (N/M) | 1340 | 1300 | 1340 | 1430 | 1360 | 1260 |
| Looptack, (N/M) | 2170 | 2140 | 1570 | 1710 | 1540 | 770 |
| 70° C. Shear. (K.S.) | 6 | 60.3 | 69.1 | 807 | 51.4 | 854 |

TABLE 5

| Cont/Ex | FORMULA | EB DOSE (kGy) | LOOPTACK | 180° PEEL, RT | 180° PEEL, 70° C. | ETS. 70° C. |
|---|---|---|---|---|---|---|
| Cont. 16 | 1 | 0 | 2550 | 1670 | 140 | 0.2 |
| Ex. 16 | 1 | 75 | 2410 | 1620 | 190 | 9.9 |
| Cont. 17 | 2 | 0 | 2570 | 1600 | 65 | 0.1 |
| Ex. 17 | 2 | 75 | 1260 | 1520 | 265 | 25.2 |
| Cont. 18 | 2 | 0 | 1950 | 1350 | 245 | 3.0 |
| Ex. 18 | 3 | 75 | 1220 | 1240 | 280 | 218.2 |

EXAMPLE 19

The multiarmed copolymer Kraton ™ D-1320X has an incipient gel dosage of 25 kGy. A mixture of 30 parts of the multiarmed copolymer, 31 parts Escorez ™ 5300 and 39 parts Regalrez ™ 1065 also required 25 kGy to achieve incipient gel formation.

CONTROL 19 AND EXAMPLES 20 TO 25

Table 6 establishes that other saturated compounds, namely brominated hydrocarbon fire retardants, can be successfully added to Kraton ™ 1107 and reduce incipient gel dosage.

CONTROL 20 AND EXAMPLES 26–29

Control 20 and Examples 26–29 are for the combination of an SBS copolymer Kraton ™ D-1102 tackified with a mixture of Regalrez ™ 6108 and Kadol Oil a hydrogenated mineral oil in the presence of trimethylolpropane tri(3-mercaptopropionate) as a multifunctional polythiol crossliner. As can be seen in Table 7, the combination gives on cure excellent elevated temperature shear.

TABLE 6

| Cont/Ex | Kraton ™ D-1107 | BCL-462 | HBCDD | BE-51 | PYROCHEK | INCIPIENT GEL (kGy) |
|---|---|---|---|---|---|---|
| Cont. 19 | — | — | — | — | — | 85 |
| Ex. 20 | 98 | 2 | — | — | — | 55 |
| Ex. 21 | 95.2 | 4.8 | — | — | — | 55 |
| Ex. 22 | 87 | 13 | — | — | — | 55 |
| Ex. 23 | 95.2 | — | 4.8 | — | — | 65 |
| Ex. 24 | 95.2 | — | — | 4.8 | — | 55 |
| Ex. 25 | 95.2 | — | — | — | 4.8 | 65 |

Staytex ™ BCL-462 = 1,2-dibromoethyl-3,4-dibromocyclohexane (Ethyl Corp.)
HBCDD = hexabromocyclodecane (Great Lakes Chemical)
BE-51 = tetrabromo-bis-phenol-A, bis(allyl ether) (Great Lakes Chemical)
Pyrocheck ™ 68DB = poly(tribromostyrene) (Ferro Corp.)

TABLE 7

|  | Cont 15 | Ex 26 | Ex 27 | Ex 28 | Ex 29 |
|---|---|---|---|---|---|
| Kraton D-1102 | 40 | 40 | 40 | 40 | 40 |
| Regalrez 6108 | 50 | 50 | 50 | 50 | 50 |
| Kaydol Oil | 10 | 10 | 10 | 10 | 10 |
| TMPTMP* | 0 | 0.6 | 0.6 | 1 | 1 |
| Antioxidant | 1 | 1 | 1 | 1 | 1 |

TABLE 7-continued

|  | Cont 15 | Ex 26 | Ex 27 | Ex 28 | Ex 29 |
|---|---|---|---|---|---|
| EB dosage (kGy) | 0 | 20 | 50 | 20 | 50 |
| 180° Peel, (N/M) | 1390 | 1180 | 1120 | 1130 | 1060 |
| Looptack, (N/M) | 1750 | 1352 | 1770 | 1850 | 1110 |
| 70° C. Shear (K.S.)** | 1 | 2.3 | 120+*** | 11.8 | 120+*** |

*TMPTMP is trimethylolpropane tri(3-mercaptopropionate)
**Weight is 1000 g and overlap area is 1 sq. in.
***No failure

I claim:

1. A pressure-sensitive adhesive consisting essentially of a free radical cured mixture containing at least 15 parts by weight of at least one unsaturated elastomeric polymer and at least one tackifying organic additive which is substantially non-responsive to the action of free radicals and selected from the group consisting of saturated aromatic resins, aromatic resins which are at least 50% saturated, saturated aliphatic resins, aliphatic resins in which at least 65% of the unsaturated groups in the resin as formed in saturated or made non responsive to the action of free radicals and saturated oils, said additive present in an amount sufficient to modify the properties of the cured elastomeric polymer, said cured adhesive pressure-sensitive formed in the absence of a non elastomeric cross-linker having a glass transition temperature at least 10° C. below use temperature and an elevated temperature shear higher than the elevated temperature shear prior to cure, said mixture when at a proportion of 40 parts by weight elastomeric polymer and 60 parts by weight organic additive having relative incipient gel dosage of cure of no more than about 1.65 at an electron beam radiation level of 200 kv.

2. A pressure-sensitive adhesive as claimed in claim 1 in which the organic additive is provided to tackify the pressure-sensitive adhesive and the tackifying organic additive is present in a concentration of from about 40 to about 90 per cent by weight based on the total weight of elastomeric polymer and organic additive.

3. A pressure-sensitive adhesive as claimed in claim 1 in which the organic additive is present in a concentration of about 45 to about 85 percent by weight based on the weight of the elastomeric polymer and organic additive.

4. A pressure-sensitive adhesive as claimed in claim 1 in which the unsaturated elastomeric polymer is selected form the group consisting of natural rubber, styrene-butadiene block copolymers, styrene-butadiene-styrene block copolymers, styrene-isoprene block copolymers, styrene-isoprene-styrene block copolymers, multiarmed-styrene-isoprene block copolymers, polybutadiene, polyisoprene and mixtures thereof.

5. A pressure-sensitive adhesive as claimed in claim 2 in which the unsaturated elastomeric polymer is selected form the group consisting of natural rubber, styrene-butadiene block copolymers, styrene-butadiene-styrene block copolymers, styrene-isoprene block copolymers, styrene-isoprene-styrene block copolymers, multiarmed-styrene-isoprene block copolymers, polybutadiene, polyisoprene and mixtures thereof.

6. A pressure-sensitive adhesive as claimed in claim 1 in which the organic additive is selected from the group consisting of saturated aliphatic resins, saturated aromatic resins, saturated oils and mixtures thereof.

7. A pressure-sensitive adhesive as claimed in claim 2 in which the organic additive is selected from the group consisting of saturated aliphatic resins, saturated aromatic resins, saturated oils and mixtures thereof.

8. A pressure-sensitive adhesive as claimed in claim 4 in which the organic additive is selected from the group consisting of saturated aliphatic resins, saturated aromatic resins, saturated oils and mixtures thereof.

9. A pressure-sensitive adhesive as claimed in claim 1 in which the unsaturated elastomeric polymer is selected from the group consisting of ABA block copolymers AB block copolymers; multiarmed $(AB)_x$ block copolymers and mixtures thereof, wherein A is a block comprising at least one monoalkenyl arene, B is an elastomeric conjugated diene block and x has a value greater than 2.

10. A pressure-sensitive adhesive as claimed in claim 2 in which the unsaturated elastomeric polymer is selected form the group consisting of ABA block copolymers AB block copolymers; multiarmed $(AB)_x$ block copolymers and mixtures thereof, wherein A is a block comprising at least one monoalkenyl arene, B is an elastomeric conjugated diene block and x has a value greater than 2.

11. A pressure-sensitive adhesive as claimed in claim 9 in which the organic additive is selected from the group consisting of saturated aliphatic resins, saturated aromatic resins, saturated oils and mixtures thereof.

12. A pressure-sensitive adhesive consisting essentially of a free radical cured mixture comprising from about 15 to about 60 parts by weight of an unsaturated styrene-isoprene-styrene block copolymer and from about 85 to about 40 parts by weight tackifying organic additive which is substantially non-responsive to the action of free radicals and selected from the group consisting of saturated aromatic resins, aromatic resins which are at least 50% saturated, saturated aliphatic resins, aliphatic resins in which at least 65% of the unsaturated groups of the resin are saturated, saturated oils and mixtures thereof, said pressure-sensitive adhesive formed in the absence of a non elastomeric cross-linker having a higher elevated temperature shear as compared to the mixture prior to cure and a glass transition temperature at least 10° C. below use temperature, said mixture in a proportion of 40 parts by weight copolymer and 60 parts by weight organic additive has the relative incipient gel dosage of cure about no more than 1.65 at an electron beam radiation level of 200 kv.

13. A pressure-sensitive adhesive as claimed in claim 12 in which is present prior to cure an end block reinforcing agent which is compatible with the styrene blocks.

14. A pressure-sensitive adhesive consisting essentially of a free radical cured mixture comprising, based on the weight of the mixture, from 15 to about 60 parts by weight of a multiarmed styrene-isoprene block copolymer ad from about 40 to about 85 parts by weight of a tackifying organic additive which is substantially non-responsive to the action of free radicals and selected form the group consisting of saturated aromatic resins, saturated aliphatic resins aromatic resins which are at least 50% saturated aliphatic resins in which at least 65% of the saturated group of the resin as formed are saturated and mixtures thereof, and pressure-sensitive adhesive formed in the absence of a non elastomeric cross-linker having a high elevated temperature shear as compared to the mixture prior to cure and a glass transition temperature of at least 10° C. below use temperature and said mixture in a proportion of 40% parts by weight copolymer and 60 parts by weight organic additive has a relative incipient gel dosage of cure about no more than 1.65 at an electron beam radiation level of 200 kv.

15. A pressure-sensitive adhesive as claimed in claim 14 in which is present prior to cure an end block reinforcing agent which is compatible with the styrene blocks.

16. A pressure-sensitive adhesive consisting essentially of a free radical cured mixture comprising, based on the weight of the mixture, from 15 to about 60 percent by weight of a styrene-butadiene-styrene block copolymer and form about 40 to about 85 parts by weight of a tackifying organic additive which is substantially non-responsive to the action of free radicals selected from the group consisting of aromatic resins, aromatic resins which are at least 50% saturated and mixtures thereof with saturated aliphatic resins in which at least 65% of the unsaturated group of the resins are saturated, saturated aliphatic resins and saturated oils, said pressure-sensitive adhesive being formed in the absence of a non elastomeric cross-linker and having a high elevated temperature shear as compared to the mixture prior to cure and a glass transition temperature of at least 10° C. below use temperature, said mixture in a proportion of 40 parts by weight copolymer and 60 parts by weight organic additive has no relative incipient gel dosage of cure about no more than 1.65 at an electron beam level of 200 kv.

17. A pressure-sensitive adhesive as claimed in claim 16 in which is present prior to cure an end block reinforcing agent which is compatible with the styrene blocks.

* * * * *

UNITED STATES PATENT AND TRADEMARK OFFICE
CERTIFICATE OF CORRECTION

PATENT NO.  :   5,115,008
DATED       :   May 19, 1992
INVENTOR(S) :   Yukihiko Sasaki It is certified that error appears in the above-identified patent and that said Letters Patent is hereby corrected as shown below:

On the title page: Item

[56] References Cited, U.S. PATENT DOCUMENTS, change "Paulin et al." to -- Pavlin et al. --.

Column 1, line 4, change "this" to -- This --.
Column 1, line 57, after "use of" change "a" to -- an --.

Column 2, lines 18,19, change "TM" to -- ™ -- (both occurrences).

Column 4, lines 41,42, change "temperatures" to -- temperature --  (2nd occurrence)
Column 4, lines 56,58,61,66, change "TM" to -- ™ --.
Column 4, line 62, change "P115" to -- P-115 --.

Column 5, lines 1,3,5, change "TM" to -- ™ -- (all occurrences).
Column 5, line 5, change "Eastman chemical" to -- Eastman Chemical --.

Column 6, lines 11,12,14,17,22,30,31, change "TM" to -- ™ -- (all occurrences).
Column 6, line 18, after "representative" change "cf" to -- of --.
Column 6, line 19, change "alphatic" to -- aliphatic --.
Column 6, line 23, change "well known" to -- well-known --.
Column 6, line 31, after "was" delete "as".

UNITED STATES PATENT AND TRADEMARK OFFICE
CERTIFICATE OF CORRECTION

PATENT NO. : 5,115,008
DATED : May 19, 1992
INVENTOR(S) : Yukihiko Sasaki

It is certified that error appears in the above-identified patent and that said Letters Patent is hereby corrected as shown below:

Column 6, line 35, change "cf" to -- of --.
Column 6, line 43, change "Peel" to -- peel --.

Column 7, lines 16,17,18,34,43,44,46,58,59,62,66,67,68, change "TM" to -- ™ -- (all occurrences).
Column 7, line 18, after "D-1320X" delete "a".
Column 7, line 44, after "there" change Was" to -- was --.
Column 7, line 44, before "100%" change "an" to -- a --.
Column 7, line 57, change "effects" to -- effect --.
Column 7, line 63, before "EXAMPLES" insert -- AND --.

Column 8, lines 5,6,7,21,24,25,26,41,42,45,49,61,63, change "TM" to -- ™ -- (all occurrences).
Column 8, line 35, change "EXAMPLES 6" to -- EXAMPLE 6 --.
Column 8, line 45, after "1033" insert a comma, and after "hydrocarbon" insert a comma.

Column 9, lines 2,42,44,45, change "TM" to -- ™ -- (all occurrences).

Column 10, lines 5,42,43,50,58,61, change "TM" to -- ™ -- (all occurrences).
Column 10, line 46, change "crossliner" to -- crosslinker --.

Column 11, line 7, change "mcercaptopropionate" to -- mercaptopropionate --.

UNITED STATES PATENT AND TRADEMARK OFFICE
CERTIFICATE OF CORRECTION

PATENT NO. : 5,115,008
DATED : May 19, 1992
INVENTOR(S) : Yukihiko Sasaki

It is certified that error appears in the above-identified patent and that said Letters Patent is hereby corrected as shown below:

In the Claims:

Column 11, line 21, after "formed" change "in" to -- is --.
Column 11, line 21, change "non responsive" to
    -- nonresponsive --.
Column 11, line 26, change "non elastomeric" to
    -- nonelastomeric --.
Column 11, line 38, change "per cent" to -- percent --.
Column 11, line 47, change "form" to -- from --.

Column 12, lines 17,18, after "copolymers" insert a comma.
Column 12, lines 25,26, after "copolymers" insert a comma.
Column 12, line 47, change "non elastomeric" to
    -- nonelastomeric --.
Column 12, line 63, after "polymer" change "ad" to
    -- and --.
Column 12, line 66, change "form" to -- from --.
Column 12, line 67, after "resins" insert a comma.

UNITED STATES PATENT AND TRADEMARK OFFICE
CERTIFICATE OF CORRECTION

PATENT NO. : 5,115,008
DATED : May 19, 1992
INVENTOR(S) : Yukihiko Sasaki

It is certified that error appears in the above-identified patent and that said Letters Patent is hereby corrected as shown below:

```
Column 13, line 2, after "thereof," and before
          "pressure-sensitive" change "and" to -- said --.
Column 13, line 3, change "non elastomeric" to
          -- nonelastomeric --.
Column 13, line 20, change "form" to -- from --.

Column 14, line 8, change "non elastomeric" to
          -- nonelastomeric --.
```

Signed and Sealed this

Twenty-second Day of March, 1994

Attest:

BRUCE LEHMAN

*Attesting Officer*   *Commissioner of Patents and Trademarks*